(12) United States Patent
Zhao et al.

(10) Patent No.: US 11,723,091 B2
(45) Date of Patent: Aug. 8, 2023

(54) UNICAST CONNECTION ESTABLISHMENT METHOD FOR DIRECT LINK, TERMINAL AND DEVICE

(71) Applicant: DATANG MOBILE COMMUNICATIONS EQUIPMENT CO., LTD., Beijing (CN)

(72) Inventors: Rui Zhao, Beijing (CN); Fangchen Cheng, Beijing (CN); Jiayi Fang, Beijing (CN); Ying Peng, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 159 days.

(21) Appl. No.: 17/267,459

(22) PCT Filed: Aug. 5, 2019

(86) PCT No.: PCT/CN2019/099197
§ 371 (c)(1),
(2) Date: Feb. 9, 2021

(87) PCT Pub. No.: WO2020/029902
PCT Pub. Date: Feb. 13, 2020

(65) Prior Publication Data
US 2021/0315033 A1    Oct. 7, 2021

(30) Foreign Application Priority Data
Aug. 10, 2018 (CN) .......................... 201810912081.0

(51) Int. Cl.
G06F 15/16 (2006.01)
H04W 76/14 (2018.01)
(Continued)

(52) U.S. Cl.
CPC .......... *H04W 76/14* (2018.02); *H04B 17/318* (2015.01); *H04W 8/24* (2013.01);
(Continued)

(58) Field of Classification Search
None
See application file for complete search history.

(56) References Cited

U.S. PATENT DOCUMENTS

2015/0156662 A1    6/2015    Bai et al.
2016/0295624 A1    10/2016   Novlan et al.
(Continued)

FOREIGN PATENT DOCUMENTS

CN    107347214 A    11/2017
WO    2017052683 A1    3/2017
(Continued)

OTHER PUBLICATIONS

"Discussion on low power consumption", R1-1704305, 3GPP TSG RAN1 Meeting #88b, Spokane, USA, Apr. 3-7, 2017.
(Continued)

*Primary Examiner* — Gary Lafontant
(74) *Attorney, Agent, or Firm* — Ladas & Parry, LLP

(57) ABSTRACT

A unicast connection establishment method for a direct link, a terminal and a device are provided, the method is applied to a first terminal and includes the following steps: determining, according to status information of at least one second terminal, one terminal of the at least one second terminal as a target terminal for a unicast communication of a direct link; and establishing a unicast connection of the direct link with the target terminal, and determining transmission configuration information for performing a unicast data communication with the target terminal.

17 Claims, 8 Drawing Sheets

(51) Int. Cl.
  *H04B 17/318*  (2015.01)
  *H04W 8/24*    (2009.01)
  *H04W 24/10*   (2009.01)
  *H04W 28/02*   (2009.01)
  *H04W 68/00*   (2009.01)

(52) U.S. Cl.
  CPC ....... *H04W 24/10* (2013.01); *H04W 28/0278* (2013.01); *H04W 68/005* (2013.01)

(56) References Cited

U.S. PATENT DOCUMENTS

| | | |
|---|---|---|
| 2017/0215183 A1 | 7/2017 | Gulati et al. |
| 2018/0077556 A1 | 3/2018 | Bienas et al. |
| 2018/0184442 A1 | 6/2018 | Bai et al. |
| 2018/0295581 A1* | 10/2018 | Krishnamoorthy .......................... H04W 52/0241 |
| 2018/0343556 A1 | 11/2018 | Wang et al. |
| 2019/0141764 A1 | 5/2019 | Fu et al. |
| 2020/0296738 A1 | 9/2020 | Inokuchi et al. |

FOREIGN PATENT DOCUMENTS

| | | |
|---|---|---|
| WO | 2017132991 A1 | 8/2017 |
| WO | 2017163545 A1 | 9/2017 |

OTHER PUBLICATIONS

"Resource scheme of FeD2D Relay", R1-1712918, 3GPP TSG RAN WG1 Meeting #90, Prague, Czech Republic, Aug. 21-25, 2017.

International Search Report from PCT/CN2019/099197, dated Oct. 30, 2019, with English translation from WIPO.

Written Opinion of the International Searching Authority from PCT/CN2019/099197, dated Oct. 30, 2019, with English translation from WIPO.

International Preliminary Report on Patentability from PCT/CN2019/099197, dated Feb. 16, 2021, with English translation from WIPO.

Extended European Search Report from EP app. No. 19848215.0, dated Jun. 16, 2021.

First Office Action from TW app. No. 108127854, dated Apr. 16, 2021, with machine English translation.

First Office Action for Korean Patent Application 10-2021-7007138 dated May 18, 2022 and its English machine translation provided by Global Dossier.

Second Office Action for European Patent Application 19 848 215.0, dated Feb. 18, 2022.

* cited by examiner

UNICAST CONNECTION ESTABLISHMENT METHOD FOR DIRECT LINK, TERMINAL AND DEVICE

CROSS-REFERENCE TO RELATED APPLICATIONS

The present application is the U.S. national phase of PCT Application PCT/CN2019/099197 filed on Aug. 5, 2019, which claims a priority to the Chinese patent application No. 201810912081.0 filed in China on Aug. 10, 2018, the disclosures of which are incorporated herein by reference in their entireties.

TECHNICAL FIELD

The present disclosure relates to the field of car networking technologies, and in particular, to a unicast connection establishment method for a direct link, a terminal and a device.

BACKGROUND

In the V2X technology, V denotes a vehicle, and X denotes various entities including, for example: Vehicle-to-Vehicle (V2V), Vehicle-to-Pedestrian (V2P), Vehicle-to-Infrastructure (V2I), and Vehicle-to-Network (V2N).

In the Device-to-Device (D2D) technology of Long Term Evolution (LTE) Rel-12/Rel-13 and the V2X technology of LTE Rel-14/Rel-15, a direct communication between UEs is supported, and when data is transmitted on a direct link, two channels are included, one is a Physical Sidelink Control Channel (PSCCH) for transmitting Scheduling Assignment information (SA), which may also be referred to as an SA Channel; the other is a Physical Sidelink Control Channel (PSSCH) for transmitting data information (which may be referred to as a data Channel). The SA indicates all necessary indication information for data reception (e.g., time-frequency resource information occupied by data transmission, modulation and coding scheme of data transmission, and indication information of reference signal for demodulation of data transmission). Correspondingly, the receiving end firstly detects the SA information carried in the PSCCH, so as to receive the data information according to the received SA.

According to the V2X technique in the related art, a unicast and multicast communication method is supported in a broadcast manner on a direct link, that is, an SA carries target identification information for indicating a User Equipment (UE) currently performing the communication, which may also be referred to as a target identification of a terminal, where if the target identification is an identification of the UE, the current communication is a unicast communication; if the target identification is the identification of a group, a multicast communication is performed; if the target identity is an identification of a broadcast, then the communication is a broadcast communication.

In the related art LTE V2X technology (Rel-14/Rel-15 LTE V2X technology), UEs always communicate in a broadcast manner to implement transmission of safety-related services. With the further development of the car networking technology, some new application scenarios appear, such as: vehicle formation, advanced driving, sensor information sharing, and remote control. Communication between UEs more communication schemes, and in addition to a broadcast communication scheme, a unicast communication scheme (communication between two UEs) is required between UEs.

SUMMARY

The present disclosure provides a unicast connection establishment method for a direct link, a terminal and a device, which are used to implement a unicast communication between terminals in the V2X technology.

A unicast connection establishment method for a direct link is provided in an embodiment of the present disclosure, applied to a first terminal and including:

determining, according to status information of at least one second terminal, one terminal of the at least one second terminal as a target terminal for a unicast communication of a direct link; and establishing a unicast connection of the direct link with the target terminal, and determining transmission configuration information for performing a unicast data communication with the target terminal.

Optionally, the method further includes:

performing the unicast data communication with the target terminal according to the determined transmission configuration information.

Optionally, the status information includes at least one of position information of the second terminal, travel track information of the second terminal and service characteristic information of services that the second terminal is capable of providing.

Optionally, the establishing the unicast connection of the direct link with the target terminal includes: sending at least one of the following information to the target terminal, to enable the target terminal to establish the unicast connection of the direct link with the first terminal according to the information sent by the first terminal:

communication capability information of a direct link of the first terminal;

measurement result information of a radio channel environment of the first terminal; and service characteristic information of a unicast communication service which is requested by the first terminal to establish.

Optionally, the establishing the unicast connection of the direct link with the target terminal includes: acquiring at least one of the following information sent by the target terminal, and establishing the unicast connection of the direct link with the target terminal according to the acquired information:

communication capability information of a direct link of the target terminal;

measurement result information of a radio channel environment of the target terminal;

transmission configuration information requested by the target terminal to negotiate;

a buffer status report (BSR) of a direct link of the target terminal; and service characteristic information of a unicast communication service of the direct link of the target terminal.

Optionally, the determining the transmission configuration information for performing the unicast data communication with the target terminal includes:

determining the transmission configuration information for performing the unicast data communication with the target terminal, according to service configuration information of the first terminal and interaction configuration information of service configuration information of the target terminal;

the service configuration information of the target terminal includes at least one of communication capability information on a direct link, measurement result information of a radio channel environment, transmission configuration information requested to negotiate, a BSR and service characteristic information; the service configuration information of the first terminal includes at least one of communication capability information of the direct link, the measurement result information of the radio channel environment and the service characteristic information.

Optionally, the communication capability information includes at least one of the following information:

a transmission waveform supported on the direct link, a set of modulation and coding Scheme (MCS) levels supported on the direct link, a bandwidth combination of different frequency bands supported on the direct link, a capability of multi-bandwidth part (BWP) operation on the direct link, a capability of multi-carrier operation on the direct link and a capability of multi-antenna operation on the direct link.

Optionally, the measurement result information includes Channel Busy Ratio (CBR) measurement information and/or measurement information of Received Signal Strength Indication (RSSI).

Optionally, the unicast data communication with the target terminal is performed in a time division multiplexing manner.

A unicast connection establishment method for a direct link is further provided in an embodiment of the present disclosure, applied to a second terminal and including:

sending status information to a first terminal; and when the first terminal determines that the second terminal is a target terminal for unicast communication of a direct link according to the status information, establishing a unicast connection of the direct link with the first terminal.

Optionally, the method further includes:

acquiring transmission configuration information which is sent by the first terminal for a unicast data communication with the second terminal; and performing the unicast data communication with the first terminal according to the transmission configuration information.

Optionally, the sending the status information to the first terminal includes:

sending to the first terminal at least one of position information of the second terminal, travel track information of the second terminal and service characteristic information of services that the second terminal is capable of providing.

Optionally, the establishing the unicast connection of the direct link with the first terminal includes: acquiring at least one of the following information sent by the first terminal, and establishing the unicast connection of the direct link with the first terminal according to the acquired information:

communication capability information of a direct link of the first terminal;

measurement result information of a radio channel environment of the first terminal; and service characteristic information of a unicast communication service which is requested by the first terminal to establish.

Optionally, the establishing the unicast connection of the direct link with the first terminal includes: sending at least one of the following information to the first terminal, to enable the first terminal to establish the unicast connection of the direct link with the second terminal according to the information sent by the second terminal:

communication capability information of a direct link of the second terminal;

measurement result information of a radio channel environment of the second terminal;

transmission configuration information requested by the second terminal to negotiate;

a buffer status report (BSR) of a direct link of the second terminal; and service characteristic information of a unicast communication service of the direct link of the second terminal.

Optionally, the communication capability information includes at least one of the following information:

a transmission waveform supported on the direct link, a set of modulation and coding Scheme (MCS) levels supported on the direct link, a bandwidth combination of different frequency bands supported on the direct link, a capability of multi-bandwidth part (BWP) operation on the direct link, a capability of multi-carrier operation on the direct link and a capability of multi-antenna operation on the direct link.

Optionally, the measurement result information includes Channel Busy Ratio (CBR) measurement information and/or measurement information of Received Signal Strength Indication (RSSI).

Optionally, the unicast data communication with the first terminal is performed in a time division multiplexing manner.

A terminal is further provided in an embodiment of the present disclosure, where the terminal is a first terminal including: a memory, a processor and a program stored in the memory and executable on the processor; where the processor executes the program to perform:

determining, according to status information of at least one second terminal, one terminal of the at least one second terminal as a target terminal for a unicast communication of a direct link; and establishing a unicast connection of the direct link with the target terminal, and determining transmission configuration information for performing a unicast data communication with the target terminal.

Optionally, the processor executes the program to perform:

performing the unicast data communication with the target terminal according to the determined transmission configuration information.

Optionally, the status information includes at least one of position information of the second terminal, travel track information of the second terminal and service characteristic information of services that the second terminal is capable of providing.

Optionally, when establishing the unicast connection of the direct link with the target terminal, the processor executes the program to perform: sending at least one of the following information to the target terminal, to enable the target terminal to establish the unicast connection of the direct link with the first terminal according to the information sent by the first terminal:

communication capability information of a direct link of the first terminal;

measurement result information of a radio channel environment of the first terminal; and service characteristic information of a unicast communication service which is requested by the first terminal to establish.

Optionally, when establishing the unicast connection of the direct link with the target terminal, the processor executes the program to perform: acquiring at least one of the following information sent by the target terminal, and establishing the unicast connection of the direct link with the target terminal according to the acquired information:

communication capability information of a direct link of the target terminal;

measurement result information of a radio channel environment of the target terminal;

transmission configuration information requested by the target terminal to negotiate;

a buffer status report (BSR) of a direct link of the target terminal; and service characteristic information of a unicast communication service of the direct link of the target terminal.

Optionally, when determining the transmission configuration information for performing the unicast data communication with the target terminal, the processor executes the program to perform:

determining the transmission configuration information for performing the unicast data communication with the target terminal, according to service configuration information of the first terminal and interaction configuration information of service configuration information of the target terminal;

the service configuration information of the target terminal includes at least one of communication capability information on a direct link, measurement result information of a radio channel environment, transmission configuration information requested to negotiate, a BSR and service characteristic information; the service configuration information of the first terminal includes at least one of communication capability information of the direct link, the measurement result information of the radio channel environment and the service characteristic information.

Optionally, the communication capability information includes at least one of the following information:

a transmission waveform supported on the direct link, a set of modulation and coding Scheme (MCS) levels supported on the direct link, a bandwidth combination of different frequency bands supported on the direct link, a capability of multi-bandwidth part (BWP) operation on the direct link, a capability of multi-carrier operation on the direct link and a capability of multi-antenna operation on the direct link.

Optionally, the measurement result information includes Channel Busy Ratio (CBR) measurement information and/or measurement information of Received Signal Strength Indication (RSSI).

Optionally, the processor executes the program to perform the unicast data communication with the target terminal in a time division multiplexing manner.

A terminal is further provided in an embodiment of the present disclosure, where the terminal is a second terminal including: a memory, a processor and a program stored in the memory and executable on the processor, where the processor executes the program to perform:

sending status information to a first terminal; and when the first terminal determines that the second terminal is a target terminal for unicast communication of a direct link according to the status information, establishing a unicast connection of the direct link with the first terminal.

Optionally, the processor executes the program to perform:

acquiring transmission configuration information which is sent by the first terminal for a unicast data communication with the second terminal; and performing the unicast data communication with the first terminal according to the transmission configuration information.

Optionally, when sending the status information to the first terminal, the processor executes the program to perform:

sending to the first terminal at least one of position information of the second terminal, travel track information of the second terminal and service characteristic information of services that the second terminal is capable of providing.

Optionally, when establishing the unicast connection of the direct link with the first terminal, the processor executes the program to perform: acquiring at least one of the following information sent by the first terminal, and establishing the unicast connection of the direct link with the first terminal according to the acquired information:

communication capability information of a direct link of the first terminal;

measurement result information of a radio channel environment of the first terminal; and service characteristic information of a unicast communication service which is requested by the first terminal to establish.

Optionally, when establishing the unicast connection of the direct link with the first terminal, the processor executes the program to perform: sending at least one of the following information to the first terminal, to enable the first terminal to establish the unicast connection of the direct link with the second terminal according to the acquired information:

communication capability information of a direct link of the second terminal;

measurement result information of a radio channel environment of the second terminal;

transmission configuration information requested by the second terminal to negotiate;

a buffer status report (BSR) of a direct link of the second terminal; and service characteristic information of a unicast communication service of the direct link of the second terminal.

Optionally, the communication capability information includes at least one of the following information:

a transmission waveform supported on the direct link, a set of modulation and coding Scheme (MCS) levels supported on the direct link, a bandwidth combination of different frequency bands supported on the direct link, a capability of multi-bandwidth part (BWP) operation on the direct link, a capability of multi-carrier operation on the direct link and a capability of multi-antenna operation on the direct link.

Optionally, the measurement result information includes Channel Busy Ratio (CBR) measurement information and/or measurement information of Received Signal Strength Indication (RSSI).

Optionally, the processor executes the program to perform the unicast data communication with the target terminal in a time division multiplexing manner.

A unicast communication device for a direct link is further provided in an embodiment of the present disclosure, applied to a first terminal and including:

a terminal determining module, configured to determine, according to status information of at least one second terminal, one terminal of the at least one second terminal as a target terminal for a unicast communication of a direct link; and a first connection establishing module, configured to establish a unicast connection of the direct link with the target terminal, and determine transmission configuration information for performing a unicast data communication with the target terminal.

A unicast communication device for a direct link is further provided in an embodiment of the present disclosure, applied to a second terminal and including:

an information sending module, configure to send status information to a first terminal; and a second connection establishing module, configured to, when the first terminal determines that the second terminal is a target terminal for unicast communication of a direct link according to the status information, establish a unicast connection of the direct link with the first terminal.

A computer-readable storage medium is further provided in an embodiment of the present disclosure, where a computer program is stored in the computer-readable storage medium, the computer program is executed by a processor to perform the unicast connection establishment method hereinabove.

The technical scheme of the present disclosure at least has the following beneficial effects.

According to the unicast connection establishment method for a direct link provide in the present disclosure, a first terminal (source UE) actively initiating a unicast communication can select, according to status information of at least one second terminal, one of second terminals as a target terminal to establish a unicast communication connection with the target terminal, thereby solving a problem that in an LTE V2X technology in the related art, UEs always communicate in a broadcast manner and cannot realize a unicast communication of the direct link.

DETAILED DESCRIPTION

To make the technical problems, technical solutions and advantages to be solved by the present disclosure clearer, the following detailed description is made with reference to the drawings and embodiments.

Figure 1:
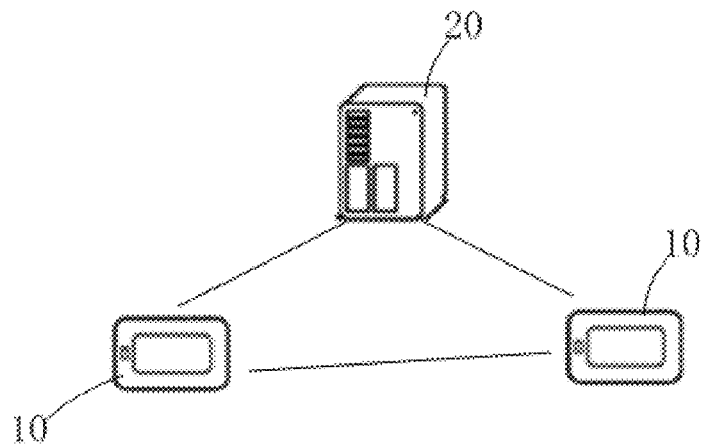
FIG. 1 is a schematic system architecture diagram illustrating a unicast connection establishment method for a direct link according to an embodiment of the present disclosure.

The unicast connection establishment method for a direct link in the embodiment of the present disclosure is applied in a car networking field. FIG. 1 shows a schematic system architecture diagram of the unicast connection establishment method for the direct link, where the system includes multiple terminals UE 10, where the terminals may be vehicle terminals, and the system is provided with devices such as a Global Positioning System (GPS), a Radio Frequency Identification (RFID), a sensor, and a camera image processing device, and the vehicle terminals may collect their own environment and status information, and transmit their own information to a network server 20 or another terminal 10 by using a wireless transmission technology.

In practical applications, the connections between the above devices may be wireless connections, and for convenience, the connections between the devices are shown by solid lines in FIG. 1.

The present disclosure is directed to a problem that in LTE V2X technology in related technologies, UEs always communicate in a broadcast manner and unicast communication of a direct link cannot be achieved, and provides a unicast connection establishment method for a direct link.

In the embodiment of the present disclosure, the direct link represents a link for directly performing communication between terminals, and is also referred to as sidelink. In addition, it is explained here that the interaction information between the terminals described below is represented as the interaction of messages on the direct link unless specific explanation.

Figure 2:
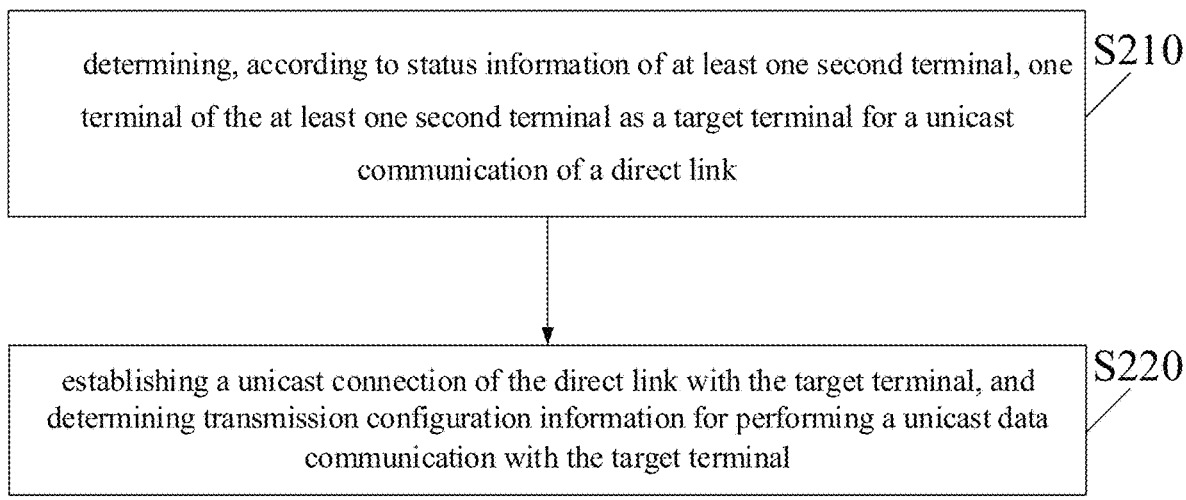
FIG. 2 is a flowchart illustrating a first embodiment of the unicast connection establishment method according to an embodiment of the present disclosure.

The unicast connection establishment method according to the embodiment of the present disclosure is applied to a first terminal, and as shown in FIG. 2, the method includes:

S210: determining, according to status information of at least one second terminal, one terminal of the at least one second terminal as a target terminal for a unicast communication of a direct link;

S220: establishing a unicast connection of the direct link with the target terminal, and determining transmission configuration information for performing a unicast data communication with the target terminal.

In the embodiment of the present disclosure, the status information includes, but is not limited to, at least one of position information, travel track information, and service characteristic information of services that the second terminal is capable of providing.

In step S220, a process of establishing a single connection of a direct link between a first terminal and a target terminal is a process of associating and communicating basic information between the first terminal and the target terminal, and transmission configuration information for performing unicast communication between the first terminal and the target terminal is determined through the process of the interaction, so as to perform the unicast data communication of the direct link between the two terminals. The following contents of the embodiments of the present disclosure will exemplify a process of establishing a unicast connection of a direct link between a first terminal and a target terminal.

Figure 3:
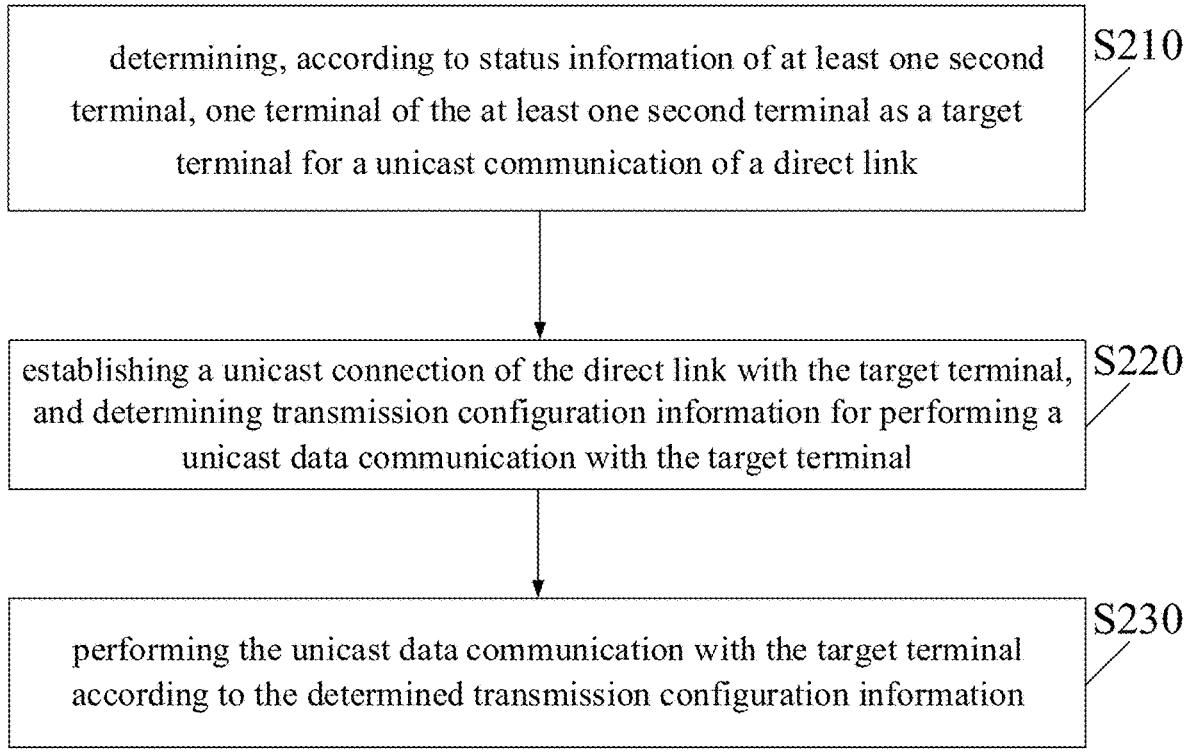
FIG. 3 is a flowchart illustrating a second embodiment of the unicast connection establishment method according to an embodiment of the present disclosure.

In another embodiment of the unicast connection establishment method according to the embodiment of the present disclosure, as shown in FIG. 3, compared to the embodiment described above, after step S220, the method further includes:

S230: performing the unicast data communication with the target terminal according to the determined transmission configuration information.

Figure 4:
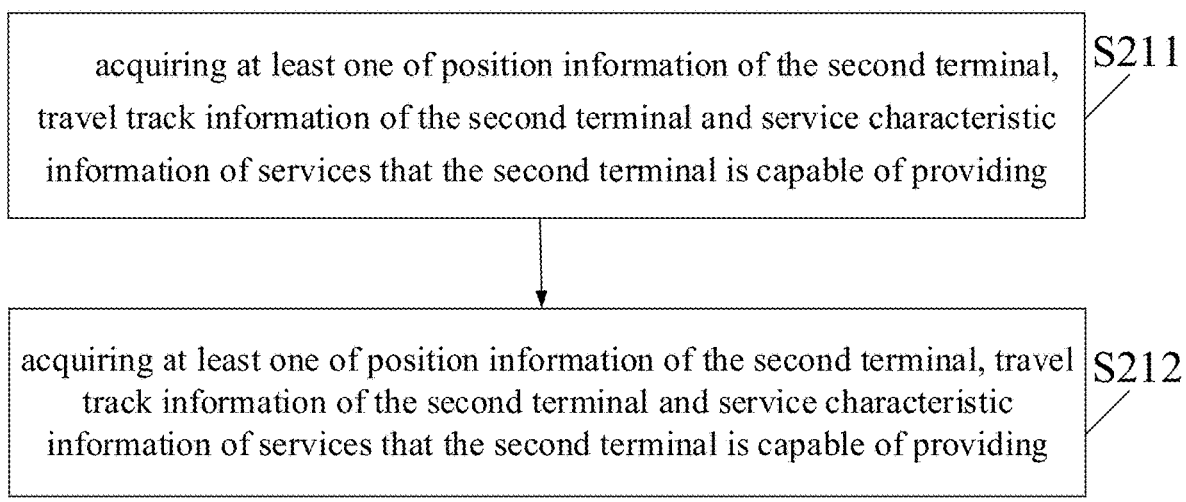
FIG. 4 is a schematic flowchart illustrating an embodiment of determining a target terminal in the unicast connection establishment method in the present disclosure.

Specifically, in the above embodiment, as shown in FIG. 4, step S210 includes:

S211: acquiring at least one of position information of the second terminal, travel track information of the second terminal and service characteristic information of services that the second terminal is capable of providing;

S212: determining, according to at least one of position information of the second terminal, travel track information of the second terminal and service characteristic information of services, one terminal of the at least one second terminal as a target terminal.

Based on the above process, the first terminal performs information interaction with the second terminal to obtain the position information, the travel track information and/or the service characteristic information of the service that the second terminal can provide, and determine the target terminal capable of performing unicast connection establishment with the first terminal.

In the step S211, the position information, the travel track information, and/or the service characteristic information of the service that the second terminal can provide may be acquired through the following two methods:

the first method: a first terminal acquires position information of a second terminal, travel track information of the second terminal and/or service characteristic information of services which can be provided by the second terminal, through paging in a designated area and according to the response of the second terminal located in the designated area, so as to determine a target terminal capable of establishing a unicast connection;

the second method: a first terminal receives a service discovery message sent by at least one second terminal, where the service discovery message includes position information of a second terminal, travel track information of the second terminal and/or service characteristic information which can be provided by the second terminal, so as to enable the first terminal to determine a target terminal for establishing a unicast connection.

Figure 5:
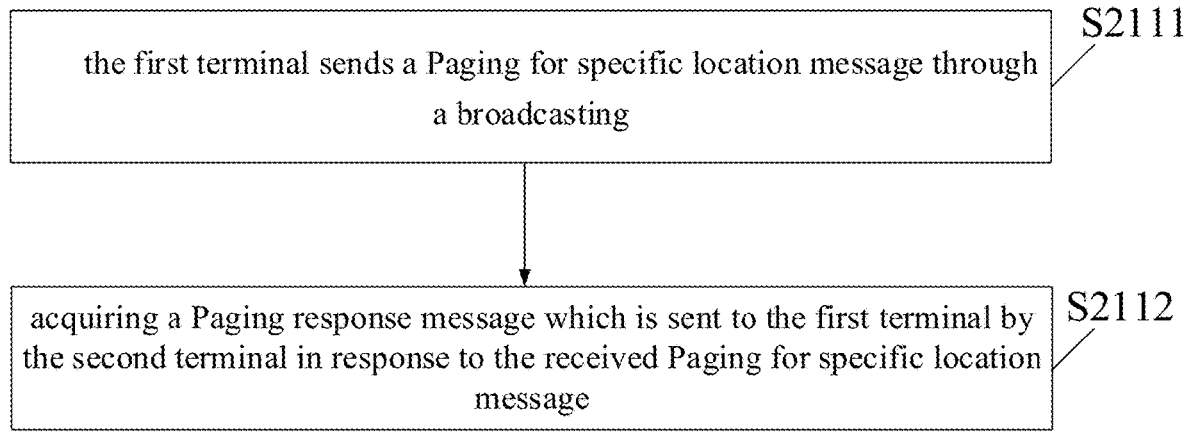
FIG. 5 is a schematic flowchart illustrating a first embodiment of performing an interaction between a first terminal and a second terminal to acquire status information of the second terminal in the unicast connection establishment method in the present disclosure.

Specifically, as shown in FIG. 5, a specific flow of the first method includes:

S2111: the first terminal sends a Paging for specific location message through a broadcasting;

where the specific location Paging for specific location message includes at least one of the following information:

identification information of the first terminal;

service characteristic information of a unicast communication service requested by the first terminal to establish; the service characteristic information includes requirements of a service type, Quality of Service (QoS), data rate, reliability, and/or delay of service. In addition, the service characteristic information may include one or more types, for example, the vehicle needs to know the road environment information of the specified area, and the service characteristic information of the road environment information may be various types, and may be environment information formed by high-precision identified target objects provided by radars of other vehicles or other vehicle-mounted sensors; video information provided for other vehicles, etc. Therefore, the first terminal provides the service characteristic information of the unicast communication service requested to establish, by sending the paging for specific location information, optionally, the service characteristic information may include multiple types, so that other terminals (i.e., the second terminal) may respond to the first terminal according to the supported service characteristic, so as to establish the unicast connection;

the location information of the target area may be location information of a GPS, and is used to indicate an area where the first terminal is to establish the unicast communication, so as to obtain more detailed road information, for example, road environment information of the target area where the first terminal is located needs to be obtained;

the information of the response area is used for indicating that if the terminal in the area can provide the unicast communication service requested to establish, a response information may be sent to the first terminal to establish the unicast connection.

Alternatively, the response area indicated in the Paging for specific location message may be a circular region with a radius R centered on the location information of the target region; or a rectangular area with the length of X and the width of Y centered on the position information of the target area, where the orientation of the specific rectangular area may be determined according to an actual road or according to a uniform coordinate system.

In addition, the Paging for specific location message may further include related information such as a vehicle travel track, for example: the Paging for specific location message includes information indicating that the second terminal that needs to respond to the Paging for specific location message needs to travel in the same direction as the first terminal.

Based on the above manner, in step S2111, after the first terminal transmits the Paging for specific location message including at least one of the above information contents in a broadcast manner, the second terminal whose status information meets the status information requirement requested in the above Paging for specific location message transmits a Paging response message to the first terminal.

Therefore, further, after step S2111, the method further includes:

S2112: acquiring a Paging response message which is sent to the first terminal by the second terminal in response to the received Paging for specific location message.

Specifically, the second terminal determines whether the status information requires the status information requested in the Paging for specific location message, according to the received Paging for specific location message sent by the first terminal; for example, when the Paging for specific location message includes the location information of the target region, the information of the response area and the service characteristic information of the unicast communication service requested to be established by the first terminal, the second terminal determines whether the second terminal is located in the region indicated in the Paging for specific location message and whether the service characteristic requested by the first terminal can be provided. If yes, a Paging response message is sent to the first terminal.

Optionally, the Paging response message sent by the second terminal includes at least one of the following information:

identification information of the first terminal;
identification information of the second terminal;
location information of the second terminal; optionally, the travel track information of the second terminal may be further included, for example: information relating to the direction of travel of the vehicle;
the service characteristic information of the service that the second terminal can provide, of course, if there is only one piece of service characteristic information of the service requested in the Paging for specific location message sent by the first terminal, the Paging response message sent by the second terminal may not include the service characteristic information of the service which can be provided.

It can be understood that there may be a case where a plurality of second terminals send the Paging response message to the first terminal, and based on the status information of the plurality of second terminals obtained through step S212, the first terminal selects one terminal from one of the second terminals sending the Paging response message as a target terminal to establish a unicast connection establishment with the target terminal, according to the obtained status information of the plurality of second terminals. The basis of the first terminal selecting one of the terminals as the target terminal is determining whether the location information of the target terminal is a requested area, and/or whether the service characteristic information of the target terminal is a requested service. When a plurality of second terminals meet the requirement, the final target terminal can be further selected through the received signal strength of the second terminals.

Figure 6:
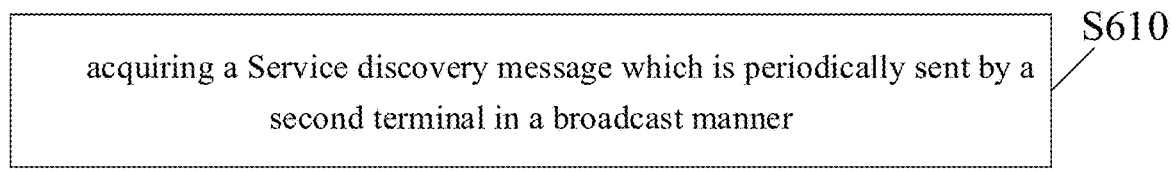
FIG. 6 is a schematic flowchart illustrating a second embodiment of performing an interaction between a first terminal and a second terminal to acquire status information of the second terminal in the unicast connection establishment method in the present disclosure.

In addition, the present disclosure also provides a second method of acquiring status information of the second terminal (i.e. at least one of position information, travel track information and service characteristic information of the service which can be provided by the second terminal, as shown in FIG. 6, the steps of this method include:

S610: acquiring a Service discovery message which is periodically sent by a second terminal in a broadcast manner, where the Service discovery message includes status information of the second terminal, that is, at least one of position information of the second terminal, travel track information of the second terminal and service characteristic information of the service which can be provided by the second terminal;

optionally, the Service discovery message may further include identification information of the second terminal.

In addition, when the Service discovery message includes service characteristic information of a service which can be provided by the second terminal, the Service discovery message may include one or more pieces of service characteristic information.

By adopting the manner of the step S610, the first terminal can also obtain the status information of at least one second terminal, and according to the status information of the second terminal, a terminal is selected as a target terminal to establish the unicast connection with. Optionally, the status information may also include signal strength, and when it is determined that all of the plurality of second terminals meet the requirement in the above manner, the target terminal may be further selected according to the signal strengths of the plurality of second terminals meeting the requirement, for example, the second terminal with the best signal strength is selected as the target terminal.

The above two ways for the first terminal to obtain the status information of the second terminal are only for illustration, and are not limited to the above two ways.

In addition, with reference to FIG. 2, after determining a target terminal for the unicast communication of the direct link with the first terminal in step S210, in step S220, the first terminal establishes the unicast connection of the direct link with the target terminal. By a process of establishing a unicast connection of the direct link with the target terminal by the first terminal, so that the unicast communication may realize an association between the first terminal and the target terminal and an interaction of some communication basic information between the first terminal and the target terminal, for example, interaction related to terminal capability, resource configuration and radio channel environment.

Specifically, the transmission configuration information of unicast data communication between the first terminal and the target terminal can be determined according to the interaction of the communication capability information on the direct link between the first terminal and the target terminal, the interaction of the measurement result information of the radio channel environment, and/or the interaction of the service characteristic information for establishing the unicast communication service.

Based on the information that needs to be interacted, optionally, in step S220, when the first terminal establishes a unicast connection of the direct link with the target terminal, the establishing the unicast connection of the direct link with the target terminal includes: sending at least one of the following information to the target terminal, to enable the target terminal to establish the unicast connection of the direct link with the first terminal according to the information sent by the first terminal:

communication capability information of a direct link of the first terminal;
measurement result information of a radio channel environment of the first terminal; and
service characteristic information of a unicast communication service which is requested by the first terminal to establish.

Optionally, in step S220, when the first terminal establishes a unicast connection of the direct link with the target terminal, the establishing of the unicast connection of the direct link with the target terminal includes: acquiring at least one of the following information sent by the target terminal, and establishing the unicast connection of the direct link with the target terminal according to the acquired information:

communication capability information of a direct link of the target terminal;

measurement result information of a radio channel environment of the target terminal;

transmission configuration information requested by the target terminal to negotiate;

a buffer status report (BSR) of a direct link of the target terminal; and service characteristic information of a unicast communication service of the direct link of the target terminal.

In step S220, the determining the transmission configuration information for performing the unicast data communication with the target terminal includes:

determining the transmission configuration information for performing the unicast data communication with the target terminal, according to service configuration information of the first terminal and interaction configuration information of service configuration information of the target terminal;

the service configuration information of the target terminal comprises at least one of communication capability information on a direct link, measurement result information of a radio channel environment, transmission configuration information requested to negotiate, a BSR and service characteristic information; the service configuration information of the first terminal comprises at least one of communication capability information of the direct link, the measurement result information of the radio channel environment and the service characteristic information.

In the embodiment of the present disclosure, the above-mentioned communication capability information on the direct link includes at least one of the following information:

a transmission waveform supported on the direct link;

a set of modulation and coding Scheme (MCS) levels supported on the direct link;

a bandwidth combination of different frequency bands supported on the direct link;

a capability of multi-bandwidth part (BWP) operation on the direct link;

a capability of multi-carrier operation on the direct link; and a capability of multi-antenna operation on the direct link.

The service characteristic information includes at least one of a service type, a Quality of Service (QoS), a data rate, reliability, a delay of a service, and the like.

The measurement result information includes Channel Busy Ratio (CBR) measurement information and/or measurement information of Received Signal Strength Indication (RSSI).

Specifically, the waveforms of the transmissions supported on the direct link include a Cyclic Prefix Orthogonal Frequency Division Multiplexing (CP-OFDM) waveform, and/or a Single-carrier Frequency-Division Multiple Access (SC-FDMA) waveform.

Specifically, the measurement result of CBR may be an average value of CBR measured based on BWP, resource pool, or a granularity of carrier; the RSSI measurement result may be an average value of RSSI measured based on BWP, resource pool or a granularity of carrier, or the RSSI measurement result may be the granularity of resource elements, and the resource elements may be Physical Resource Blocks (PRBs) or may be similar to the sub-channel granularity in LTE V2X.

In addition, in the embodiment of the present disclosure, in step S220, the determined transmission configuration information for the first terminal to perform the unicast data communication with the target terminal includes resource configuration information and/or configuration information of a channel structure.

Further, the resource configuration information may be a set of resources for transmission; the resource set may be a resource set in a granularity of resource pool, carrier, or BWP, or may also be a set of some time-frequency resources in the resource pool, the carrier, or the BWP (for example, a position of a PRB in the frequency domain and a pattern of occupied subframes).

The configuration information of the channel structure may be channel configuration determined for unicast communication between the first terminal and the target terminal, and specifically may include one or more of subcarrier interval of a physical channel, transmitted waveform, Cyclic Prefix (CP) length, Demodulation Reference Signal (DMRS) related configuration (sequence, time-frequency resource position occupied by DMRS), scrambling related configuration, Automatic Gain Control (AGC) length, Guard Period (GP) length, and the like.

The transmitted waveform is a CP-OFDM waveform and/or an SC-FDMA waveform.

Figure 7:
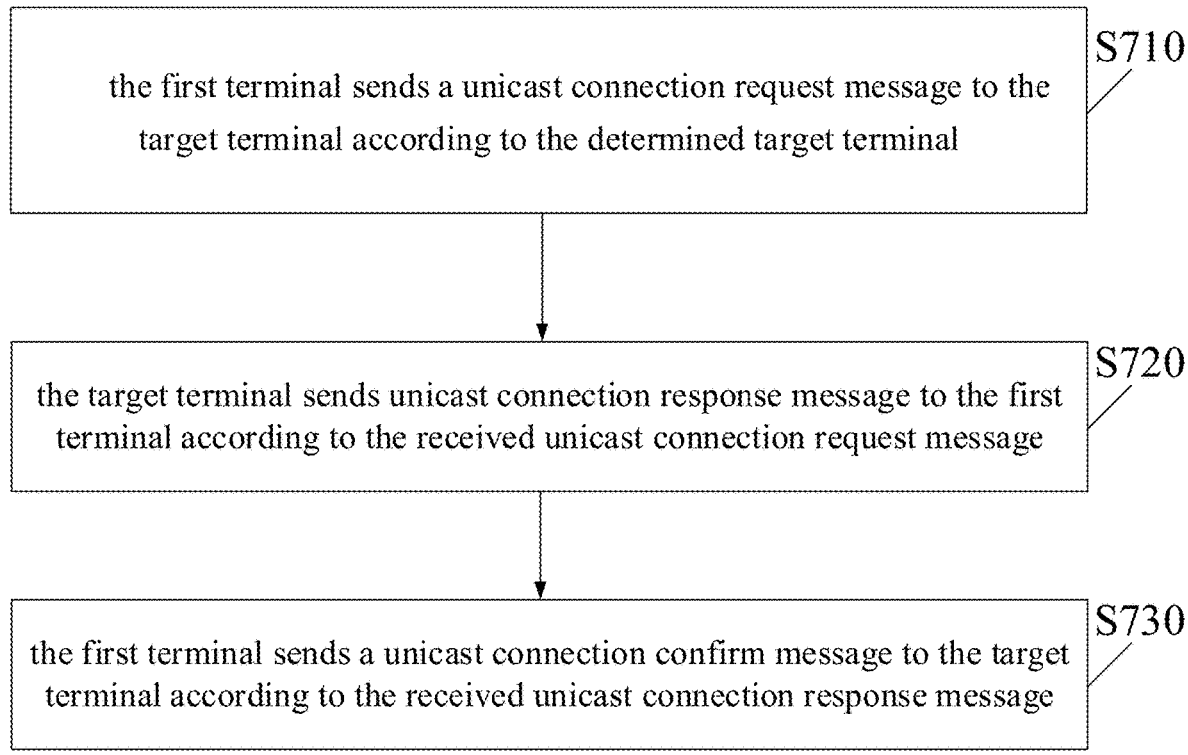
FIG. 7 is a flowchart illustrating an embodiment of unicast connection establishment of a direct link between a first terminal and a target terminal in the unicast connection establishment method in the embodiment of the present disclosure.

With reference to FIG. 7, a specific process of establishing a unicast connection of a direct link with the target terminal and determining transmission configuration information for performing unicast data communication with the target terminal in the unicast connection establishment method according to the embodiment of the present disclosure is described as an example.

As shown in FIG. 7, the process of establishing the unicast connection of the direct link with the target terminal may include:

S710: the first terminal sends a unicast connection request message to the target terminal according to the determined target terminal, and based on the unicast connection request message, the unicast connection request message contains service configuration information of the first terminal, and the service configuration information includes at least one of communication capability information on a direct link, measurement result information of a radio channel environment and service characteristic information.

In addition, the unicasting connection request message may further include identification information of the first terminal, so that the target terminal receiving the unicasting connection request message knows which terminal is the first terminal sending the unicasting connection request message; the unicasting connection request message may further include identification information of a target terminal, so that a terminal receiving the unicasting connection request message can determine whether the terminal is a target terminal that the first terminal needs to send.

In this step, by sending the communication capability information to the target terminal in the unicast connection request message, the target terminal can know the communication capability on the direct link of the first terminal, so that the target terminal does not send data in a manner exceeding the communication capability of the first terminal in the unicast communication data interaction process of the direct link.

The measurement result information of the radio channel environment included in the unicast connection request message includes measurement of CBR of the first terminal for the activated or configured BWP, the resource pool, and the carrier and/or measurement of RSSI of the first terminal for the activated or configured BWP, the resource pool, and the carrier, so as to perform negotiation of resource configuration and/or channel configuration with the target terminal.

The service characteristic information included in the unicast connection request message is the service characteristic information requested by the first terminal to establish the unicast communication service. According to the step of acquiring the status information of the second terminal, when the second status is sent to the status information of the first state, which indicates that the service characteristic information of the service that can be provided is at least two types, for example, one type is road environment information composed of an object identified by a sensor, and the other type is video information of the road environment, in this process, the first terminal may select one type of the service characteristic information to perform unicast communication connection establishment, and send the service characteristic information of the unicast communication service requested to be established to the target terminal through a unicast connection request message.

S720: the target terminal sends unicast connection response message to the first terminal according to the received unicast connection request message;

the first terminal receives the unicast connection response message;

where the unicast connection response message includes at least one of the following information:

communication capability information of a direct link of the target terminal;

measurement result information of a radio channel environment of the target terminal;

transmission configuration information requested by the target terminal to negotiate;

a buffer status report (BSR) of a direct link of the target terminal; and service characteristic information of a unicast communication service of the direct link of the target terminal.

Optionally, the unicast connection response message may further include identification information of the first terminal, so that the first terminal receiving the unicast connection response message learns that the unicast connection response message is a message sent to the first terminal itself; the unicast connection response message may further include identification information of a target terminal, so that the first terminal receiving the unicast connection response message can acquire which terminal the target terminal sending the unicast connection response message is.

In this step, the communication capability information is sent to the first terminal in the unicast connection response message, so that the first terminal knows the communication capability on the direct link of the target terminal, and thus, in the process of performing unicast communication data interaction on the direct link, the first terminal does not send data in a manner exceeding the communication capability of the target terminal.

In this step, the communication capability information on the direct link sent in the unicast connection response message is a measurement result of CBR measurement of the target terminal on the activated or configured BWP, resource pool or carrier and/or RSSI measurement of the target terminal on the activated or configured BWP, resource pool or carrier, so as to negotiate resource configuration and/or channel configuration with the first UE.

In this step, the transmission configuration information requested to negotiate sent in the unicast connection response message may be in the following two forms:

one form of the transmission configuration information requested to negotiate is: the target terminal obtains resource configuration and/or channel configuration in the intersection of the measurement result of the BWP, resource pool or carrier measured by the first terminal and the measurement result of the activated or configured BWP, resource pool or carrier by the target terminal, then the resource configuration and/or channel configuration is included in the unicast connection response message, and then the target terminal negotiates with the first UE for the resource configuration and/or channel configuration;

another form of the transmission configuration information requested to negotiate is: the target terminal directly indicates the information of the resource configuration and/or the channel configuration of the unicast communication through the transmission configuration information requested to negotiate and according to the measurement result of the BWP, the resource pool or the carrier measured by the first terminal and the measurement result of the activated or configured BWP, the resource pool or the carrier by the target terminal. Optionally, the information of the resource configuration and/or channel configuration of the unicast communication indicated by the transmission configuration information requested to negotiate may be the BWP, resource pool or carrier in the intersection of the measurement result of the BWP, resource pool or carrier measured by the first terminal and the measurement result of activated or configured BWP, resource pool or carrier by the target terminal.

In addition, optionally, in step S720, the unicast connection response message sent by the target terminal to the first terminal may further include prediction information of the relevant service QoS, for example, information such as a period of service transmission and a change in packet size.

S730: the first terminal sends a unicast connection confirm message to the target terminal according to the received unicast connection response message;

optionally, in the unicast connection confirm message sent by the first terminal, at least one of the following information is included:

identification information of the first terminal;

identification information of the target terminal;

transmission configuration information for performing unicast data communication with the target terminal;

initial resource allocation information for the target terminal to transmit unicast communication data.

Optionally, the first terminal sends the above-mentioned unicast connection confirm message in the determined transmission configuration information for performing unicast data communication with the target terminal.

Through the steps S710 to S730, the unicast connection of the direct link can be established between the first terminal and the target terminal, and the transmission configuration information for performing unicast data communication with the target terminal is determined for subsequent unicast data communication.

The unicast connection establishment of the direct link between the first terminal and the target terminal is not limited to be implemented only in the above manner, and may also be implemented in other manners, which are not described in detail herein.

After the unicast connection of the direct link is established between the first terminal and the target terminal, as shown in FIG. 3, the method may further include:

S230: performing the unicast data communication with the target terminal according to the determined transmission configuration information.

Optionally, in step S230, when performing unicast data communication with the target terminal, the unicast data communication with the target terminal is performed in a time division multiplexing manner.

In addition, the first terminal may negotiation with the target terminal for the specific transmission resources, and the unicast data communication with the target terminal in a time division multiplexing manner may be performed in one of the following manners:

semi-statically negotiating, namely semi-statically determining a specific resource pattern occupied by the sending resource according to the service characteristics of the first terminal and the target terminal;

realizing time division multiplexing of the transmission resources between the terminals by a method that the terminals reserve at least the next transmission resource; for example, when the first terminal sends data, the first terminal informs time information of resources occupied next time (for example, starting time of the next resource occupation and duration of the resource occupation), the target terminal avoids the resources reserved by the first terminal from a time domain when selecting the resources, and at the same time informs the first terminal of the time information of the resources occupied next time, so that the first terminal can conveniently select the resources;

potentially, resource allocation methods of the "master-slave" type can be used, for example, the first terminal allocates the transmission resources of the first terminal and the target terminal.

The above manner for implementing unicast data communication between the first terminal and the target terminal is merely exemplary, and is not limited to this specific manner.

It should be noted that, in the unicast connection establishment method according to the embodiment of the present disclosure, the identification information of the first terminal, the identification information of the second terminal, and the identification information of the target terminal may be a Media Access Control (MAC) address ID, an Internet Protocol (IP) address, a UE ID, or the like.

The unicast connection establishment method for the direct link provided by the embodiment of the disclosure can realize unicast communication between terminals in the V2X technology, thereby effectively supporting communication requirements in an application scene of the car networking technology, avoiding resource conflict and improving the utilization rate of resources.

Figure 8:
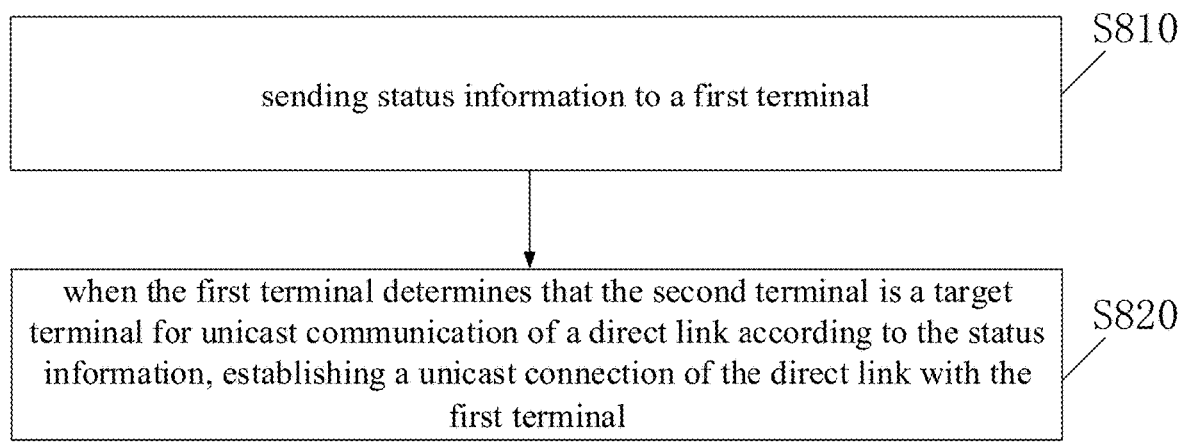
FIG. 8 is a flowchart illustrating a third embodiment of the unicast connection establishment method according to an embodiment of the present disclosure.

The embodiment of the present disclosure further provides a unicast connection establishment method for a direct link, which is applied to a second terminal, where as shown in FIG. 8, the method includes:

S810: sending status information to a first terminal;

S820: when the first terminal determines that the second terminal is a target terminal for unicast communication of a direct link according to the status information, establishing a unicast connection of the direct link with the first terminal.

In the embodiment of the present disclosure, the status information includes, but is not limited to, at least one of position information, travel track information, and service characteristic information of services which can be provided by the second terminal.

Figure 9:
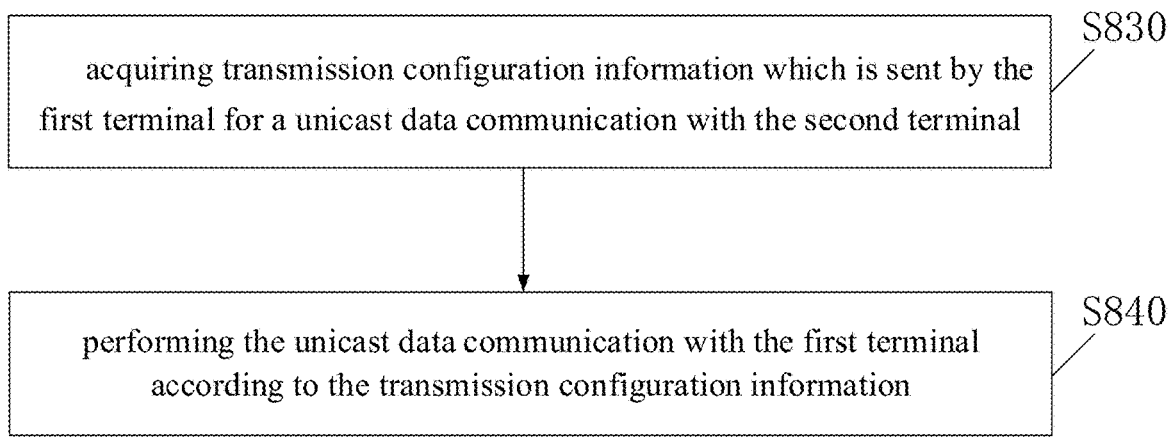
FIG. 9 is a flowchart illustrating a fourth embodiment of the unicast connection establishment method according to an embodiment of the present disclosure.

Optionally, in this embodiment of the present disclosure, after step S820, as shown in FIG. 9, the method may further include the steps of:

S830: acquiring transmission configuration information which is sent by the first terminal for a unicast data communication with the second terminal;

S840: performing the unicast data communication with the first terminal according to the transmission configuration information.

Optionally, in step S810, the sending the status information to the first terminal includes:

sending to the first terminal at least one of position information of the second terminal, travel track information of the second terminal and service characteristic information of services that the second terminal is capable of providing.

In the above process, the source terminal actively initiating unicast communication, that is, the first terminal, may send the status information to the first terminal through information interaction with the second terminal.

Specifically, the first terminal performs information interaction with the second terminal, so that the second terminal sends the status information to the first terminal in the following two ways:

the first method: a first terminal acquires position information of a second terminal, travel track information of the second terminal and/or service characteristic information of services which can be provided by the second terminal, through paging in a designated area and according to the response of the second terminal located in the designated area, so as to determine a target terminal capable of establishing a unicast connection;

the second method: a second terminal sends a service discovery message actively, where the service discovery message includes position information of a second terminal, travel track information of the second terminal and/or service characteristic information which can be provided by the second terminal, so as to enable the first terminal to determine a target terminal for establishing a unicast connection.

Figure 10:
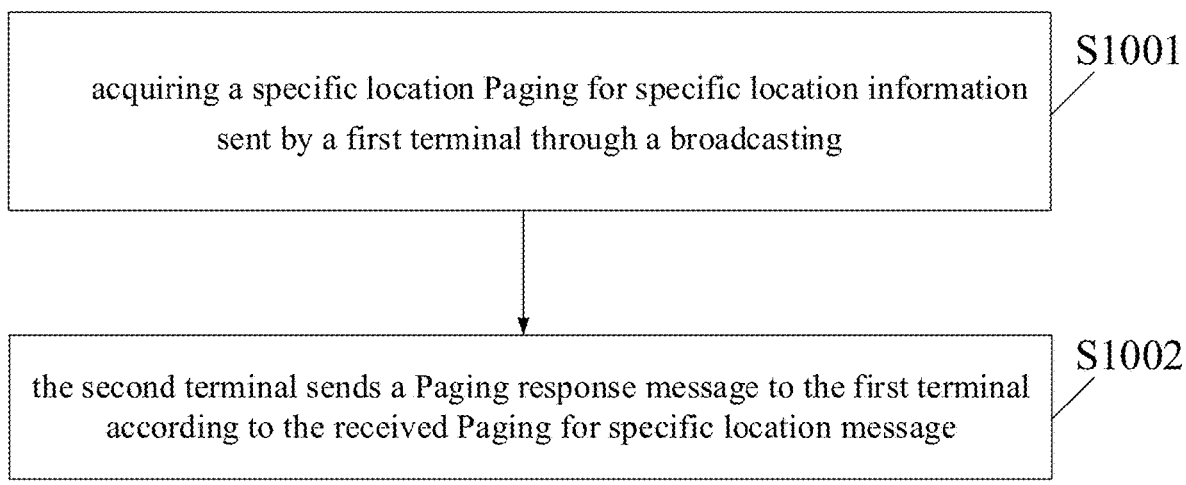
FIG. 10 is a schematic flowchart illustrating a third embodiment of performing an interaction between a first terminal and a second terminal to acquire status information of the second terminal in the unicast connection establishment method in the present disclosure.

Specifically, as shown in FIG. 10, a specific flow of the first method includes:

S1001: acquiring a specific location Paging for specific location information sent by a first terminal in a broadcasting method;

where the specific location Paging for specific location message includes at least one of the following information:

identification information of the first terminal;

service characteristic information of a unicast communication service requested by the first terminal to establish; the service characteristic information includes requirements of a service type, Quality of Service (QoS), data rate, reliability, and/or delay of service. In addition, the service characteristic information may include one or more types, for example, the vehicle needs to know the road environment information of the specified area, and the service characteristic information of the road environment information may be various types, and may be environment information formed by high-precision identified target objects provided by radars of other vehicles or other vehicle-mounted sensors; video information provided for other vehicles, etc. Therefore, the first terminal provides the service characteristic information of the unicast communication service requested to establish, by sending the paging for specific location information, optionally, the service characteristic information may include multiple types, so that other terminals (i.e., the second terminal) may respond to the first terminal according to the supported service characteristic, so as to establish the unicast connection;

the location information of the target area may be location information of a GPS, and is used to indicate an area where the first terminal is to establish the unicast communication, so as to obtain more detailed road information, for example, road environment information of the target area where the first terminal is located needs to be obtained;

the information of the response area is used for indicating that if the terminal in the area can provide the unicast communication service requested to establish, a response information may be sent to the first terminal to establish the unicast connection.

S1002: the second terminal sends a Paging response message to the first terminal according to the received Paging for specific location message.

Specifically, the second terminal determines whether the status information requires the status information requested in the Paging for specific location message, according to the received Paging for specific location message sent by the first terminal; for example, when the Paging for specific location message includes the location information of the target region, the information of the response area and the service characteristic information of the unicast communication service requested to be established by the first terminal, the second terminal determines whether the second terminal is located in the region indicated in the Paging for specific location message and whether the service characteristic requested by the first terminal can be provided. If yes, a Paging response message is sent to the first terminal.

Optionally, the Paging response message sent by the second terminal includes at least one of the following information:

identification information of the first terminal;

identification information of the second terminal;

location information of the second terminal; optionally, the travel track information of the second terminal may be further included, for example: information relating to the direction of travel of the vehicle;

the service characteristic information of the service that the second terminal can provide, of course, if there is only one piece of service characteristic information of the service requested in the Paging for specific location message sent by the first terminal, the Paging response message sent by the second terminal may not include the service characteristic information of the service which can be provided.

Figure 11:
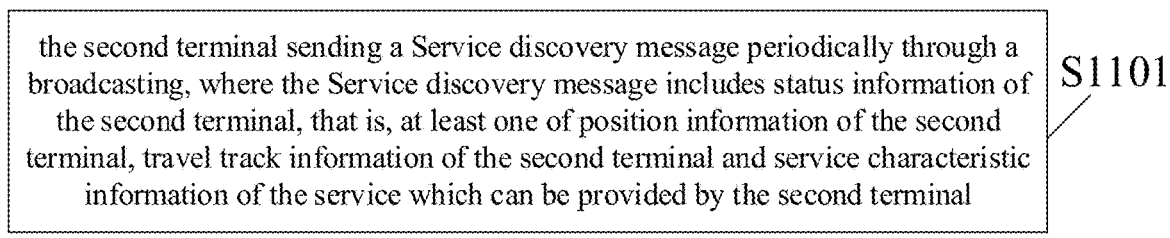
FIG. 11 is a schematic flowchart illustrating a fourth embodiment of performing an interaction between a first terminal and a second terminal to acquire status information of the second terminal in the unicast connection establishment method in the present disclosure.

Specifically, as shown in FIG. 11, a specific flow of the second method includes:

S1101: the second terminal sending a Service discovery message periodically through a broadcasting, where the Service discovery message includes status information of the second terminal, that is, at least one of position information of the second terminal, travel track information of the second terminal and service characteristic information of the service which can be provided by the second terminal;

optionally, the Service discovery message may further include identification information of the second terminal.

In addition, when the Service discovery message includes service characteristic information of a service which can be provided by the second terminal, the Service discovery message may include one or more pieces of service characteristic information.

Optionally, in step S820, the establishing a unicast connection of the direct link with the first terminal includes acquiring at least one of the following information sent by the first terminal, and establishing a unicast connection of the direct link with the first terminal according to the acquired information:

communication capability information of a direct link of the first terminal;

measurement result information of a radio channel environment of the first terminal; and service characteristic information of a unicast communication service which is requested by the first terminal to establish.

Optionally, in step S820, the establishing a unicast connection of a direct link with the first terminal includes sending at least one of the following information to the first terminal, so that the first terminal establishes a unicast connection of a direct link with the second terminal according to the information sent by the second terminal:

communication capability information of a direct link of the target terminal;

measurement result information of a radio channel environment of the target terminal;

transmission configuration information requested by the target terminal to negotiate;

a buffer status report (BSR) of a direct link of the target terminal; and service characteristic information of a unicast communication service of the direct link of the target terminal.

In this embodiment of the present disclosure, optionally, the communication capability information includes at least one of the following information: a transmission waveform supported on the direct link; a set of modulation and coding Scheme (MCS) levels supported on the direct link; a bandwidth combination of different frequency bands supported on the direct link; a capability of multi-bandwidth part (BWP) operation on the direct link; a capability of multi-carrier operation on the direct link; and a capability of multi-antenna operation on the direct link.

In addition, optionally, the measurement result information includes Channel Busy Ratio (CBR) measurement information and/or measurement information of Received Signal Strength Indication (RSSI).

Figure 12:
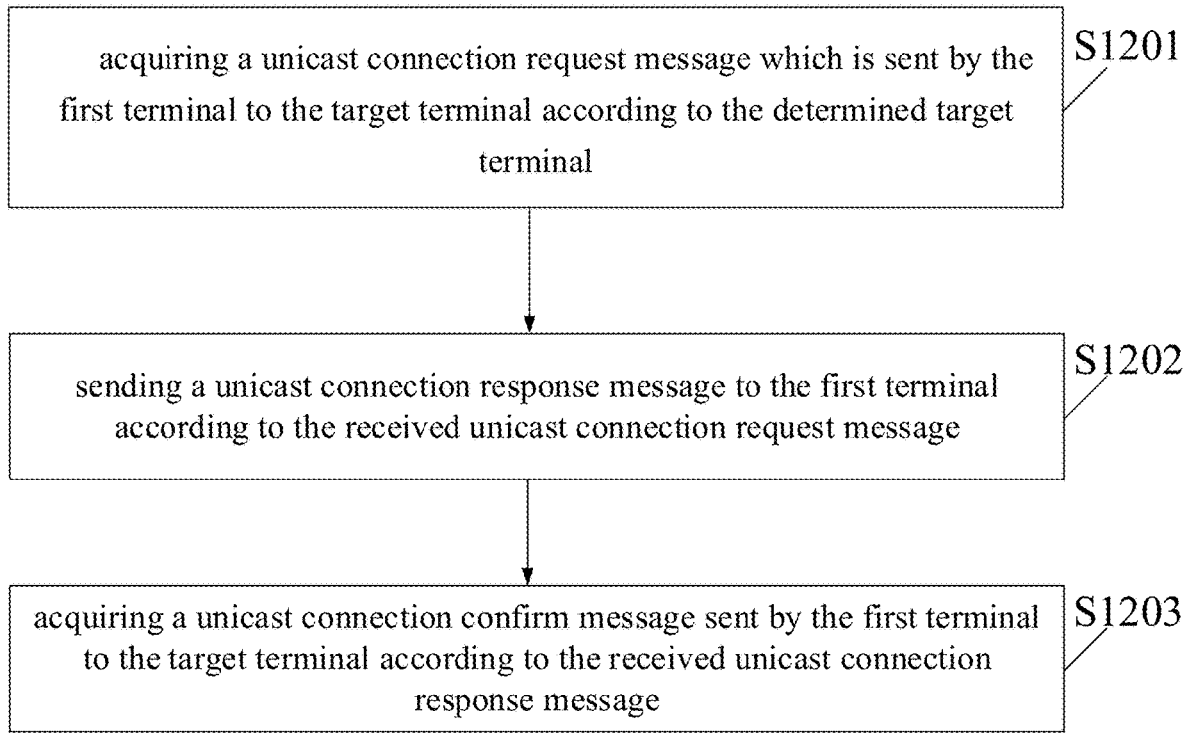
FIG. 12 is a flowchart illustrating another embodiment of establishing a unicast connection of a direct link between a first terminal and a target terminal in the unicast connection establishment method in the embodiment of the present disclosure.

With reference to FIG. 12, a specific process of establishing a unicast connection of a direct link between a second terminal and a first terminal and determining transmission configuration information for performing unicast data communication with the first terminal in the unicast connection establishment method according to the embodiment of the present disclosure is described as an example.

As shown in FIG. 12, the process of establishing the unicast connection of the direct link with the first terminal may include:

S1201: acquiring a unicast connection request message which is sent by the first terminal to the target terminal according to the determined target terminal, and based on the unicast connection request message, the unicast connection request message contains service configuration information of the first terminal, and the service configuration information includes at least one of communication capability information on a direct link, measurement result information of a radio channel environment and service characteristic information.

It can be understood that, in this step, the target terminal determined by the first terminal is one of the second terminals, and after determining that the second terminal establishing the unicast connection of the direct link is the target terminal, the first terminal establishes the unicast connection with the determined target terminal.

In addition, the unicasting connection request message may further include identification information of the first terminal, so that the target terminal receiving the unicasting connection request message knows which terminal is the first terminal sending the unicasting connection request message; the unicasting connection request message may further include identification information of a target terminal, so that a terminal receiving the unicasting connection request message can determine whether the terminal is a target terminal that the first terminal needs to send.

S1202: sending a unicast connection response message to the first terminal according to the received unicast connection request message;

where the unicast connection response message includes at least one of the following information:

communication capability information of a direct link of the target terminal;

measurement result information of a radio channel environment of the target terminal;

transmission configuration information requested by the target terminal to negotiate;

a buffer status report (BSR) of a direct link of the target terminal; and service characteristic information of a unicast communication service of the direct link of the target terminal.

Optionally, the unicast connection response message may further include identification information of the first terminal, so that the first terminal receiving the unicast connection response message learns that the unicast connection response message is a message sent to the first terminal itself; the unicast connection response message may further include identification information of a target terminal, so that the first terminal receiving the unicast connection response message can acquire which terminal the target terminal sending the unicast connection response message is.

In this step, the communication capability information is sent to the first terminal in the unicast connection response message, so that the first terminal knows the communication capability on the direct link of the target terminal, and thus, in the process of performing unicast communication data interaction on the direct link, the first terminal does not send data in a manner exceeding the communication capability of the target terminal.

In this step, the communication capability information on the direct link sent in the unicast connection response message is a measurement result of CBR measurement of the target terminal on the activated or configured BWP, resource pool or carrier and/or RSSI measurement of the target terminal on the activated or configured BWP, resource pool or carrier, so as to negotiate resource configuration and/or channel configuration with the first UE.

In this step, the transmission configuration information requesting negotiation sent in the unicast connection response message may be in the following two forms:

one form of the transmission configuration information requested to negotiate is: the target terminal obtains resource configuration and/or channel configuration in the intersection of the measurement result of the BWP, resource pool or carrier measured by the first terminal and the measurement result of the activated or configured BWP, resource pool or carrier by the target terminal, then the resource configuration and/or channel configuration is included in the unicast connection response message, and then the target terminal negotiates with the first UE for the resource configuration and/or channel configuration;

another form of the transmission configuration information requested to negotiate is: the target terminal directly indicates the information of the resource configuration and/or the channel configuration of the unicast communication through the transmission configuration information requested to negotiate and according to the measurement result of the BWP, the resource pool or the carrier measured by the first terminal and the measurement result of the activated or configured BWP, the resource pool or the carrier by the target terminal. Optionally, the information of the resource configuration and/or channel configuration of the unicast communication indicated by the transmission configuration information requested to negotiate may be the BWP, resource pool or carrier in the intersection of the measurement result of the BWP, resource pool or carrier measured by the first terminal and the measurement result of activated or configured BWP, resource pool or carrier by the target terminal.

In addition, optionally, in step S1102, the unicast connection response message sent by the target terminal to the first terminal may further include prediction information of the relevant service QoS, for example, information such as a period of service transmission and a change in packet size.

S1203: acquiring a unicast connection confirm message sent by the first terminal to the target terminal according to the received unicast connection response message;

optionally, in the unicast connection confirm message sent by the first terminal, at least one of the following information is included:

identification information of the first terminal;

identification information of the target terminal;

transmission configuration information for performing unicast data communication with the target terminal;

initial resource allocation information for the target terminal to transmit unicast communication data.

Optionally, the first terminal sends the above-mentioned unicast connection confirm message in the determined transmission configuration information for performing unicast data communication with the target terminal.

Through the above steps S1201 to S1203, the unicast connection of the direct link can be established between the first terminal and the target terminal, and the transmission configuration information for performing unicast data communication with the target terminal is determined for subsequent unicast data communication.

In the unicast connection establishment method according to the embodiment of the present disclosure, after the unicast connection establishment of the direct link is performed between the first terminal and the target terminal, as shown in FIG. 9, the method further includes step S840 of performing unicast data communication with the first terminal according to the acquired transmission configuration information, where in the step of performing unicast data communication with the first terminal, the unicast data communication is performed with the first terminal in a time division multiplexing manner.

Optionally, in step S840, when performing unicast data communication with the first terminal, the unicast data communication is performed with the first terminal in a time division multiplexing manner.

In addition, the first terminal may negotiation with the target terminal for the specific transmission resources, and the unicast data communication with the target terminal in a time division multiplexing manner may be performed in one of the following manners:

semi-statically negotiating, namely semi-statically determining a specific resource pattern occupied by the sending resource according to the service characteristics of the first terminal and the target terminal;

realizing time division multiplexing of the transmission resources between the terminals by a method that the terminals reserve at least the next transmission resource; for example, when the first terminal sends data, the first terminal informs time information of resources occupied next time (for example, starting time of the next resource occupation and duration of the resource occupation), the target terminal avoids the resources reserved by the first terminal from a time domain when selecting the resources, and at the same time informs the first terminal of the time information of the resources occupied next time, so that the first terminal can conveniently select the resources;

potentially, resource allocation methods of the "master-slave" type can be used, for example, the first terminal allocates the transmission resources of the first terminal and the target terminal.

The above manner for implementing unicast data communication between the first terminal and the target terminal is merely exemplary, and is not limited to this specific manner.

It should be noted that, in the unicast connection establishment method of the direct link applied to the second terminal according to the embodiment of the present disclosure, the same features mentioned above as those in the unicast connection establishment method of the direct link applied to the first terminal are the same in meaning, and the meaning of each feature is not described again in detail here.

Figure 13:
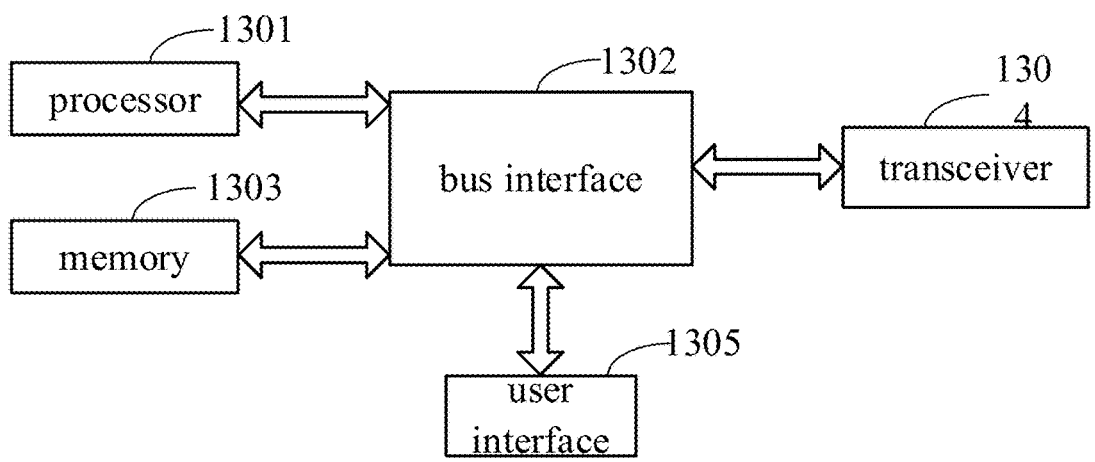
FIG. 13 is a schematic diagram illustrating a first embodiment of the terminal according to an embodiment of the present disclosure.

As shown in FIG. 13, a terminal is further provided in an embodiment of the present disclosure, where the terminal is a first terminal, and the first terminal includes: a processor 1301; and a memory 1303 connected to the processor 1301 via the bus interface 1302, where the memory 1303 is used for storing programs and data used by the processor 1301 during operation, and the processor 1301 calls and executes the programs and data stored in the memory 1303.

The transceiver 1304 is connected to the bus interface 1302, and is configured to receive and transmit data under the control of the processor 1301, and specifically, the processor 1301 is configured to read a program in the memory 1303 and execute the following processes:

determining, according to status information of at least one second terminal, one terminal of the at least one second terminal as a target terminal for a unicast communication of a direct link; and establishing a unicast connection of the direct link with the target terminal, and determining transmission configuration information for performing a unicast data communication with the target terminal.

Optionally, the processor 1301 executes the program to perform:

performing the unicast data communication with the target terminal according to the determined transmission configuration information.

Optionally, the status information includes at least one of position information of the second terminal, travel track information of the second terminal and service characteristic information of services that the second terminal is capable of providing.

Optionally, when establishing the unicast connection of the direct link with the target terminal, the processor 1301 executes the program to perform: sending at least one of the following information to the target terminal, to enable the target terminal to establish the unicast connection of the direct link with the first terminal according to the information sent by the first terminal:

communication capability information of a direct link of the first terminal;

measurement result information of a radio channel environment of the first terminal; and service characteristic information of a unicast communication service which is requested by the first terminal to establish.

Optionally, when establishing the unicast connection of the direct link with the target terminal, the processor 1301 executes the program to perform: acquiring at least one of the following information sent by the target terminal, and establishing the unicast connection of the direct link with the target terminal according to the acquired information:

communication capability information of a direct link of the target terminal;

measurement result information of a radio channel environment of the target terminal;

transmission configuration information requested by the target terminal to negotiate;

a buffer status report (BSR) of a direct link of the target terminal; and service characteristic information of a unicast communication service of the direct link of the target terminal.

Optionally, when determining the transmission configuration information for performing the unicast data communication with the target terminal, the processor 1301 executes the program to perform:

determining the transmission configuration information for performing the unicast data communication with the target terminal, according to service configuration information of the first terminal and interaction configuration information of service configuration information of the target terminal;

the service configuration information of the target terminal includes at least one of communication capability information on a direct link, measurement result information of a radio channel environment, transmission configuration information requested to negotiate, a BSR and service characteristic information; the service configuration information of the first terminal includes at least one of communication capability information of the direct link, the measurement result information of the radio channel environment and the service characteristic information.

Optionally, the communication capability information includes at least one of the following information:

a transmission waveform supported on the direct link, a set of modulation and coding Scheme (MCS) levels supported on the direct link, a bandwidth combination of different frequency bands supported on the direct link, a capability of multi-bandwidth part (BWP) operation on the direct link, a capability of multi-carrier operation on the direct link and a capability of multi-antenna operation on the direct link.

Optionally, the measurement result information includes Channel Busy Ratio (CBR) measurement information and/or measurement information of Received Signal Strength Indication (RSSI).

Optionally, the processor executes the program to perform the unicast data communication with the target terminal in a time division multiplexing manner.

It is noted that in FIG. 13, the bus architecture may include any number of interconnected buses and bridges, with one or more processors represented by the processor 1301 and various circuits represented by the memory 1303 being linked together. The bus architecture may also link together various other circuits such as peripherals, voltage regulators, power management circuits, and the like, which are well known in the art, and therefore, will not be described any further herein. The bus interface provides an interface. The transceiver 1304 may be a plurality of elements, including a transmitter and a transceiver, providing a means for communicating with various other apparatus over a transmission medium. The user interface 1305 may also be an interface capable of interfacing with a desired device for a different terminal, including but not limited to a keypad, display, speaker, microphone, joystick, etc. The processor 1301 is responsible for managing the bus architecture and general processing, and the memory 1303 may store data used by the processor 1301 in performing operations.

Those skilled in the art will understand that all or part of the steps for implementing the above embodiments may be implemented by hardware, or may be implemented by a computer program instructing relevant hardware, where the computer program includes instructions for executing all or part of the steps of the above methods; and the computer program may be stored in a readable storage medium, which may be any form of storage medium.

Figure 14:
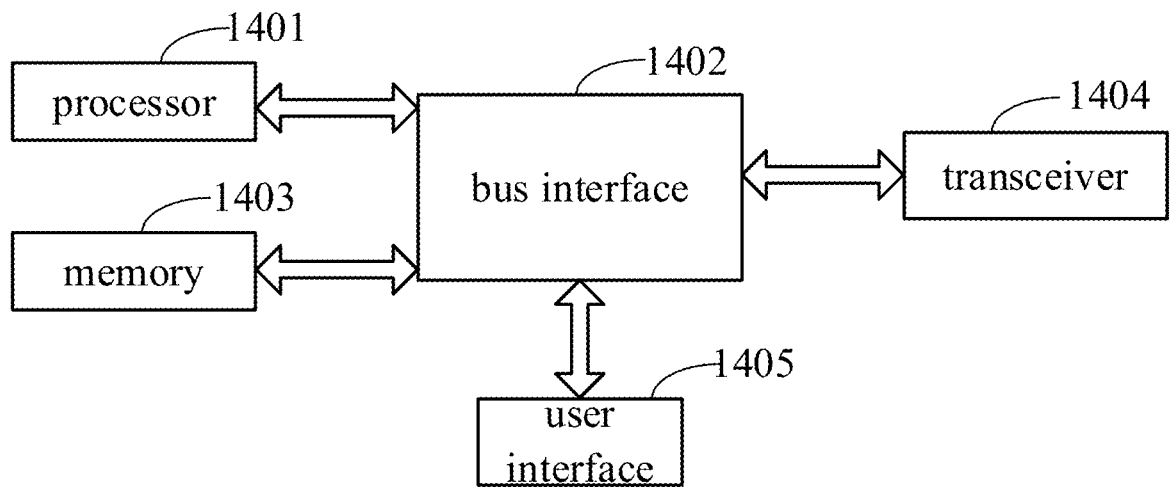
FIG. 14 is a schematic diagram illustrating a second embodiment of the terminal according to an embodiment of the disclosure.

As shown in FIG. 14, another terminal is further provided in an embodiment of the present disclosure, where the terminal is a second terminal, and the second terminal includes: a processor 1401; and a memory 1403 connected with the processor 1401 through a bus interface 1402, where the memory 1403 is used for storing programs and data used by the processor 1401 when executing operations, and the processor 1401 calls and executes the programs and data stored in the memory 1403.

The transceiver 1404 is connected to the bus interface 1402, and is configured to receive and transmit data under the control of the processor 1401, and specifically, the processor 1401 is configured to read a program in the memory 1403 and execute the following processes:

sending status information to a first terminal; and when the first terminal determines that the second terminal is a target terminal for unicast communication of a direct link according to the status information, establishing a unicast connection of the direct link with the first terminal.

Optionally, the processor 1401 executes the program to perform:

acquiring transmission configuration information which is sent by the first terminal for a unicast data communication with the second terminal; and performing the unicast data communication with the first terminal according to the transmission configuration information.

Optionally, when sending the status information to the first terminal, the processor 1401 executes the program to perform:

sending to the first terminal at least one of position information of the second terminal, travel track information of the second terminal and service characteristic information of services that the second terminal is capable of providing.

Optionally, when establishing the unicast connection of the direct link with the first terminal, the processor 1401 executes the program to perform: acquiring at least one of the following information sent by the first terminal, and establishing the unicast connection of the direct link with the first terminal according to the acquired information:

communication capability information of a direct link of the first terminal;

measurement result information of a radio channel environment of the first terminal; and service characteristic information of a unicast communication service which is requested by the first terminal to establish.

Optionally, when establishing the unicast connection of the direct link with the first terminal, the processor 1401 executes the program to perform: sending at least one of the following information to the first terminal, to enable the first terminal to establish the unicast connection of the direct link with the second terminal according to the acquired information:

communication capability information of a direct link of the second terminal;

measurement result information of a radio channel environment of the second terminal;

transmission configuration information requested by the second terminal to negotiate;

a buffer status report (BSR) of a direct link of the second terminal; and service characteristic information of a unicast communication service of the direct link of the second terminal.

Optionally, the communication capability information includes at least one of the following information:

a transmission waveform supported on the direct link, a set of modulation and coding Scheme (MCS) levels supported on the direct link, a bandwidth combination of different frequency bands supported on the direct link, a capability of multi-bandwidth part (BWP) operation on the direct link, a capability of multi-carrier operation on the direct link and a capability of multi-antenna operation on the direct link.

Optionally, the measurement result information includes Channel Busy Ratio (CBR) measurement information and/or measurement information of Received Signal Strength Indication (RSSI).

Optionally, the processor 1401 executes the program to perform the unicast data communication with the target terminal in a time division multiplexing manner.

It is noted that in FIG. 14, the bus architecture may include any number of interconnected buses and bridges, with one or more processors represented by processor 1401 and various circuits represented by memory 1403 being linked together. The bus architecture may also link together various other circuits such as peripherals, voltage regulators, power management circuits, and the like, which are well known in the art, and therefore, will not be described any further herein. The bus interface provides an interface. The transceiver 1404 may be a plurality of elements, including a transmitter and a transceiver, providing a means for communicating with various other apparatus over a transmission medium. The user interface 1405 may also be an interface capable of interfacing with a desired device for a different terminal, including but not limited to a keypad, display, speaker, microphone, joystick, etc. The processor 1401 is responsible for managing the bus architecture and general processing, and the memory 1403 may store data used by the processor 1401 in performing operations.

Those skilled in the art will understand that all or part of the steps for implementing the above embodiments may be implemented by hardware, or may be implemented by a computer program instructing relevant hardware, where the computer program includes instructions for executing all or part of the steps of the above methods; and the computer program may be stored in a readable storage medium, which may be any form of storage medium.

Figure 15:
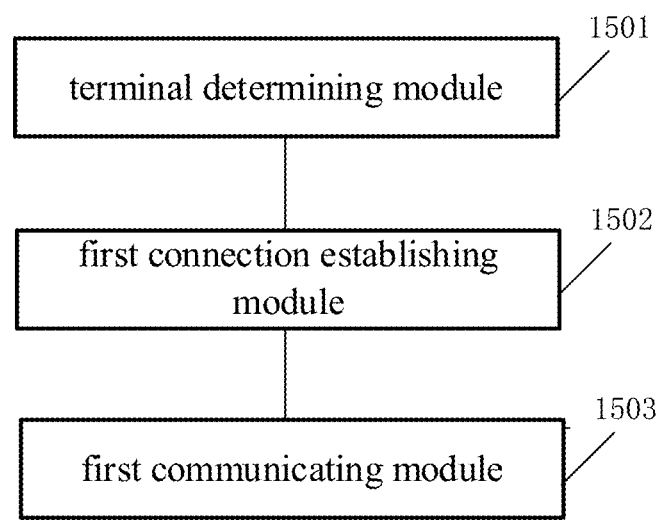
FIG. 15 is a schematic diagram illustrating a first embodiment of the unicast communication device according to an embodiment of the present disclosure.

A unicast communication device for a direct link is further provided in an embodiment of the present disclosure, which is applied to a first terminal, and as shown in FIG. 15, the device includes:

a terminal determining module 1501, configured to determine, according to status information of at least one second terminal, one terminal of the at least one second terminal as a target terminal for a unicast communication of a direct link;

a first connection establishing module 1502, configured to establish a unicast connection of the direct link with the target terminal, and determine transmission configuration information for performing a unicast data communication with the target terminal.

Optionally, the device further includes:

a first communicating module 1503, configured to perform the unicast data communication with the target terminal according to the determined transmission configuration information.

Optionally, the status information includes at least one of position information of the second terminal, travel track information of the second terminal and service characteristic information of services that the second terminal is capable of providing.

Optionally, that first connection establishing module 1502 establishes the unicast connection of the direct link with the target terminal includes: sending at least one of the following information to the target terminal, to enable the target terminal to establish the unicast connection of the direct link with the first terminal according to the information sent by the first terminal:

communication capability information of a direct link of the first terminal;

measurement result information of a radio channel environment of the first terminal; and service characteristic information of a unicast communication service which is requested by the first terminal to establish.

Optionally, that first connection establishing module 1502 establishes the unicast connection of the direct link with the target terminal includes: acquiring at least one of the following information sent by the target terminal, and establishing the unicast connection of the direct link with the target terminal according to the acquired information:

communication capability information of a direct link of the target terminal;

measurement result information of a radio channel environment of the target terminal;

transmission configuration information requested by the target terminal to negotiate;

a buffer status report (BSR) of a direct link of the target terminal; and service characteristic information of a unicast communication service of the direct link of the target terminal.

Optionally, that the first connection establishing module 1502 determines the transmission configuration information for performing the unicast data communication with the target terminal includes:

determining the transmission configuration information for performing the unicast data communication with the target terminal, according to service configuration information of the first terminal and interaction configuration information of service configuration information of the target terminal;

the service configuration information of the target terminal includes at least one of communication capability information on a direct link, measurement result information of a radio channel environment, transmission configuration information requested to negotiate, a BSR and service characteristic information; the service configuration information of the first terminal includes at least one of communication capability information of the direct link, the measurement result information of the radio channel environment and the service characteristic information.

Optionally, the communication capability information includes at least one of the following information:

a transmission waveform supported on the direct link, a set of modulation and coding Scheme (MCS) levels supported on the direct link, a bandwidth combination of different frequency bands supported on the direct link, a capability of multi-bandwidth part (BWP) operation on the direct link, a capability of multi-carrier operation on the direct link and a capability of multi-antenna operation on the direct link.

Optionally, the measurement result information includes Channel Busy Ratio (CBR) measurement information and/or measurement information of Received Signal Strength Indication (RSSI).

Optionally, the first communicating module 1503 performs the unicast data communication with the target terminal in a time division multiplexing manner.

Figure 16:
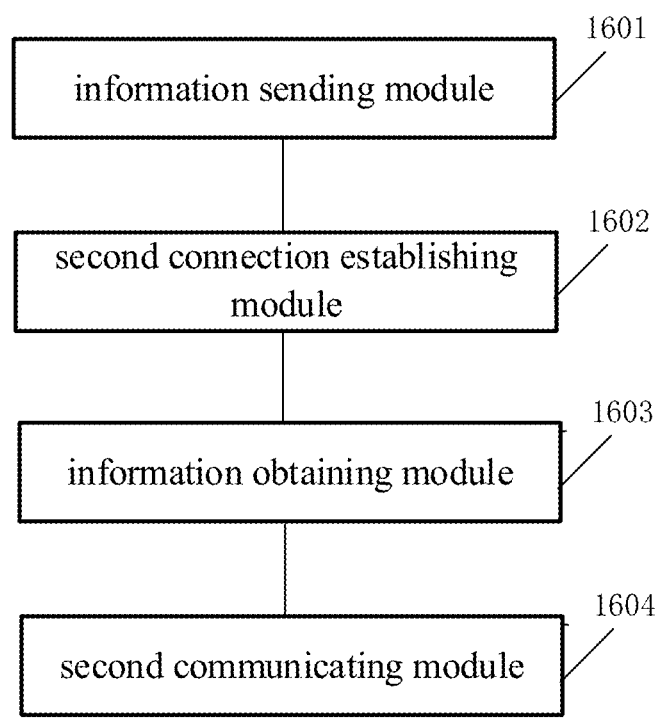
FIG. 16 is a schematic diagram illustrating a second embodiment of the unicast communication device according to an embodiment of the present disclosure.

Another unicast communication device for a direct link is further provided in an embodiment of the present disclosure, which is applied to a second terminal, as shown in FIG. 16, the device includes:

an information sending module 1601, configured to send status information to a first terminal;

a second connection establishing module 1602, configured to, when the first terminal determines that the second terminal is a target terminal for unicast communication of a direct link according to the status information, establish a unicast connection of the direct link with the first terminal.

Optionally, the device further includes:

an information obtaining module 1603, configured to acquire transmission configuration information which is sent by the first terminal for a unicast data communication with the second terminal;

a second communicating module 1604, configured to perform the unicast data communication with the first terminal according to the transmission configuration information.

Optionally, that the information sending module 1601 sends the status information to the first terminal includes:

sending to the first terminal at least one of position information of the second terminal, travel track information of the second terminal and service characteristic information of services that the second terminal is capable of providing.

Optionally, that the second connection establishing module 1602 establishes the unicast connection of the direct link with the first terminal includes: acquiring at least one of the following information sent by the first terminal, and establishing the unicast connection of the direct link with the first terminal according to the acquired information:

communication capability information of a direct link of the first terminal;

measurement result information of a radio channel environment of the first terminal; and service characteristic information of a unicast communication service which is requested by the first terminal to establish.

Optionally, that the second connection establishing module 1602 establishes the unicast connection of the direct link with the first terminal includes: sending at least one of the following information to the first terminal, to enable the first terminal to establish the unicast connection of the direct link with the second terminal according to the acquired information:

communication capability information of a direct link of the second terminal;

measurement result information of a radio channel environment of the second terminal;

transmission configuration information requested by the second terminal to negotiate;

a buffer status report (BSR) of a direct link of the second terminal; and service characteristic information of a unicast communication service of the direct link of the second terminal.

Optionally, the communication capability information includes at least one of the following information:

a transmission waveform supported on the direct link, a set of modulation and coding Scheme (MCS) levels supported on the direct link, a bandwidth combination of different frequency bands supported on the direct link, a capability of multi-bandwidth part (BWP) operation on the direct link, a capability of multi-carrier operation on the direct link and a capability of multi-antenna operation on the direct link.

Optionally, the measurement result information includes Channel Busy Ratio (CBR) measurement information and/or measurement information of Received Signal Strength Indication (RSSI).

Optionally, the second communicating module 1604 performs the unicast data communication with the target terminal in a time division multiplexing manner.

A computer-readable storage medium is further provided in an embodiment of the present disclosure, where a computer program is stored in the computer-readable storage medium, and when the computer program is executed by a processor, the computer program implements each process of each embodiment of the unicast connection establishment method described above, and can achieve the same technical effect, and in order to avoid repetition, the computer program is not described herein again. The computer-readable storage medium may be a Read-Only Memory (ROM), a Random Access Memory (RAM), a magnetic disk or an optical disk.

It should be noted that, in this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. Without further limitation, an element identified by the phrase "including an . . . " does not exclude the presence of other identical elements in the process, method, article, or apparatus that includes the element.

Through the description of the foregoing embodiments, it is clear to those skilled in the art that the method of the foregoing embodiments may be implemented by software plus a necessary general hardware platform, and certainly may also be implemented by hardware, but in many cases, the former is a better embodiment. Based on such understanding, the technical solutions of the present disclosure may be embodied in the form of a software product, which is stored in a storage medium (such as a ROM/RAM, a magnetic disk, and an optical disk), and includes several instructions for enabling a terminal (which may be a mobile phone, a computer, a server, an air conditioner, or a network device) to perform the methods according to the embodiments of the present disclosure.

While the embodiments of the present disclosure have been described in connection with the appended drawings, the present disclosure is not limited to the specific embodiments, which have been described above for illustrative purposes only and not for purposes of limitation, and it will be appreciated by those of ordinary skill in the art that, in light of the present disclosure, numerous modifications may be made without departing from the spirit of the disclosure and scope of the appended claims.

While the foregoing is directed to some embodiments of the present disclosure, it will be appreciated by those skilled in the art that various changes and modifications may be made therein without departing from the principles of the disclosure, and it is intended that such changes and modifications be covered by the scope of the disclosure.

What is claimed is:

1. A unicast connection establishment method for a direct link, applied to a first terminal and comprising:
   determining, according to status information of at least one second terminal, one terminal of the at least one second terminal as a target terminal for a unicast communication of a direct link; and
   establishing a unicast connection of the direct link with the target terminal, and determining transmission configuration information for performing a unicast data communication with the target terminal;
   wherein the status information comprises service characteristic information of the services that the at least one second terminal is capable of providing;
   the determining, according to the status information of at least one second terminal, one terminal of the at least one second terminal as the target terminal for the unicast communication of the direct link comprises:
   after sending a paging message, obtaining the service characteristic information of the services that the at least one second terminal is capable of providing, by obtaining a paging response message sent by the at least one second terminal in response to the paging message, and determining one terminal of the at least one second terminal as the target terminal for the unicast communication of the direct link; the paging message comprises service characteristic information of a unicast communication service which is requested by the first terminal to establish;
   the services that the at least one second terminal is capable of providing comprise a Vehicle-to-X (V2X) service.

2. The unicast connection establishment method according to claim 1, further comprising:
   performing the unicast data communication with the target terminal according to the determined transmission configuration information.

3. The unicast connection establishment method according to claim 2, wherein the unicast data communication with the target terminal is performed in a time division multiplexing manner.

4. The unicast connection establishment method according to claim 1, wherein the status information further comprises at least one of position information of the second terminal, or travel track information of the second terminal.

5. The unicast connection establishment method according to claim 1, wherein the establishing the unicast connection of the direct link with the target terminal further comprises: sending measurement result information of a radio channel environment of the first terminal to the target terminal.

6. The unicast connection establishment method according to claim 5, wherein the communication capability information comprises at least one of the following information:
   a transmission waveform supported on the direct link, a set of modulation and coding Scheme (MCS) levels supported on the direct link, a bandwidth combination of different frequency bands supported on the direct link, a capability of multi-bandwidth part (BWP) operation on the direct link, a capability of multi-carrier operation on the direct link and a capability of multi-antenna operation on the direct link.

7. The unicast connection establishment method according to claim 5, wherein the measurement result information comprises Channel Busy Ratio (CBR) measurement information and/or measurement information of Received Signal Strength Indication (RSSI).

8. The unicast connection establishment method according to claim 1, wherein the determining the transmission configuration information for performing the unicast data communication with the target terminal comprises:
    determining the transmission configuration information for performing the unicast data communication with the target terminal, according to service configuration information of the first terminal and interaction configuration information of service configuration information of the target terminal;
    the service configuration information of the target terminal comprises at least one of communication capability information on a direct link, measurement result information of a radio channel environment, transmission configuration information requested to negotiate, a BSR and service characteristic information; the service configuration information of the first terminal comprises at least one of communication capability information of the direct link, the measurement result information of the radio channel environment and the service characteristic information.

9. A unicast connection establishment method for a direct link, applied to a second terminal and comprising:
    sending status information to a first terminal; and
    when the first terminal determines that the second terminal is a target terminal for unicast communication of a direct link according to the status information, establishing a unicast connection of the direct link with the first terminal
    wherein the status information comprises service characteristic information of the services that the second terminal is capable of providing;
    the sending the status information to the first terminal comprises:
    sending to the first terminal, a paging response message comprising the service characteristic information of the services that the second terminal is capable of providing, in response to a paging messaged received from the first terminal and comprising service characteristic information of a unicast communication service which is requested by the first terminal to establish;
    the services that the second terminal is capable of providing comprise a Vehicle-to-X (V2X) service.

10. The unicast connection establishment method according to claim 9, further comprising:
    acquiring transmission configuration information which is sent by the first terminal for a unicast data communication with the second terminal; and
    performing the unicast data communication with the first terminal according to the transmission configuration information.

11. The unicast connection establishment method according to claim 10, wherein the unicast data communication with the first terminal is performed in a time division multiplexing manner.

12. The unicast connection establishment method according to claim 9, wherein the sending the status information to the first terminal comprises:
    sending to the first terminal at least one of position information of the second terminal, or travel track information of the second terminal.

13. The unicast connection establishment method according to claim 9, wherein the establishing the unicast connection of the direct link with the first terminal further comprises: acquiring measurement result information of a radio channel environment of the first terminal sent by the first terminal, and establishing the unicast connection of the direct link with the first terminal according to the acquired information.

14. The unicast connection establishment method according to claim 13, wherein the communication capability information comprises at least one of the following information:
    a transmission waveform supported on the direct link, a set of modulation and coding Scheme (MCS) levels supported on the direct link, a bandwidth combination of different frequency bands supported on the direct link, a capability of multi-bandwidth part (BWP) operation on the direct link, a capability of multi-carrier operation on the direct link and a capability of multi-antenna operation on the direct link.

15. The unicast connection establishment method according to claim 13, wherein the measurement result information comprises Channel Busy Ratio (CBR) measurement information and/or measurement information of Received Signal Strength Indication (RSSI).

16. A terminal, wherein the terminal is a second terminal comprising: a memory, a processor and a program stored in the memory and executable on the processor, wherein the processor executes the program to perform the unicast connection establishment method for a direct link according to claim 9.

17. A terminal, wherein the terminal is a first terminal comprising: a memory, a processor and a program stored in the memory and executable on the processor; wherein the processor executes the program to perform:
    determining, according to status information of at least one second terminal, one terminal of the at least one second terminal as a target terminal for a unicast communication of a direct link; and
    establishing a unicast connection of the direct link with the target terminal, and determining transmission configuration information for performing a unicast data communication with the target terminal;
    wherein the status information comprises service characteristic information of the services that the at least one second terminal is capable of providing;
    the processor executes the program to perform:
    after sending a paging message, obtaining the service characteristic information of the services that the at least one second terminal is capable of providing, by obtaining a paging response message sent by the at least one second terminal in response to the paging message, and determining one terminal of the at least one second terminal as the target terminal for the unicast communication of the direct link; the paging message comprises service characteristic information of a unicast communication service which is requested by the first terminal to establish;
    the services that the at least one second terminal is capable of providing comprise a Vehicle-to-X (V2X) service.

* * * * *